(12) United States Patent
Kubota et al.

(10) Patent No.: US 10,345,675 B2
(45) Date of Patent: Jul. 9, 2019

(54) OPTICAL DEVICE

(71) Applicant: PANASONIC INTELLECTUAL PROPERTY MANAGEMENT CO., LTD., Osaka (JP)

(72) Inventors: Hirofumi Kubota, Osaka (JP); Yuko Suzuka, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/567,470

(22) PCT Filed: May 10, 2016

(86) PCT No.: PCT/JP2016/002296
§ 371 (c)(1),
(2) Date: Oct. 18, 2017

(87) PCT Pub. No.: WO2016/185692
PCT Pub. Date: Nov. 24, 2016

(65) Prior Publication Data
US 2018/0120667 A1 May 3, 2018

(30) Foreign Application Priority Data
May 21, 2015 (JP) .................. 2015-103935

(51) Int. Cl.
*G02F 1/29* (2006.01)
*G02B 5/04* (2006.01)
*G02F 1/1333* (2006.01)

(52) U.S. Cl.
CPC .............. *G02F 1/29* (2013.01); *G02B 5/045* (2013.01); *G02F 1/133371* (2013.01); *G02F 2201/12* (2013.01)

(58) Field of Classification Search
CPC ....................................................... G02F 1/29
See application file for complete search history.

(56) References Cited

U.S. PATENT DOCUMENTS 4,729,640 A 3/1988 Sakata
6,011,602 A 1/2000 Miyashita et al.
(Continued)

FOREIGN PATENT DOCUMENTS

JP 61-086727 5/1986
JP 04-273213 9/1992
(Continued)

OTHER PUBLICATIONS

U.S. Appl. No. 15/568,704 to Yuko Suzuka et al., filed Oct. 23, 2017.
(Continued)

*Primary Examiner* — Richard H Kim
(74) *Attorney, Agent, or Firm* — Greenblum & Bernstein, P.L.C.

(57) ABSTRACT

An optical device includes: a first electrode; a second electrode; a refractive index adjustment layer that has a refractive index changing in response to an electric field and is changeable between a transparent state and a state in which the refractive index adjustment layer distributes incident light; and a textured layer including a plurality of protrusions protruding toward the second electrode. The refractive index adjustment layer is provided between the first electrode and the second electrode. The textured layer is provided between the first electrode and the refractive index adjustment layer. The plurality of protrusions is in the form of stripes. The protrusion has a substantially trapezoidal cross-section. A trapezoid which is a cross-sectional shape of the protrusion has a base angle θ at both ends of the lower base ranging from 70 degrees to 85 degrees.

11 Claims, 5 Drawing Sheets

(56) References Cited

U.S. PATENT DOCUMENTS

| | | | |
|---|---|---|---|
| 6,169,594 | B1 | 1/2001 | Aye et al. |
| 2006/0049749 | A1 | 3/2006 | Ishikawa et al. |
| 2010/0128349 | A1 | 5/2010 | Menez et al. |
| 2013/0286344 | A1* | 10/2013 | Hayashi ............... G02F 1/1313 349/193 |
| 2014/0218781 | A1 | 8/2014 | Kobayashi et al. |
| 2015/0077850 | A1 | 3/2015 | Kasano et al. |
| 2017/0235175 | A1 | 8/2017 | Suzuka et al. |

FOREIGN PATENT DOCUMENTS

| | | |
|---|---|---|
| JP | 06-324310 | 11/1994 |
| JP | 2002-523802 | 7/2002 |
| JP | 2006-100257 | 4/2006 |
| JP | 2009-020259 | 1/2009 |
| JP | 2010-117686 | 5/2010 |
| JP | 2010-526220 | 7/2010 |
| JP | 2011-128592 | 6/2011 |
| JP | 2012-033368 | 2/2012 |
| JP | 2012-128001 | 7/2012 |
| JP | 2013-195995 | 9/2013 |
| JP | 2013-242538 | 12/2013 |
| JP | 2014-126708 | 7/2014 |
| WO | 97/17631 | 5/1997 |
| WO | 2012/118188 | 9/2012 |
| WO | 2013/150803 | 10/2013 |

OTHER PUBLICATIONS

International Search Report (ISR) from International Searching Authority (Japan Patent Office) in International Pat. Appl. No. PCT/JP2016/002296, dated Aug. 9, 2016.

Office Action from Japan Patent Office (JPO) in Japanese Patent Appl. No. 2017-518750, dated Aug. 7, 2018.

Office Action from Japan Patent Office (JPO) in Japanese Patent Appl. No. 2017-518750, dated Dec. 18, 2018.

Office Action from Japan Patent Office (JPO) in Japanese Patent Appl. No. 2017-518750, dated Mar. 12, 2019.

* cited by examiner

FIG. 7B ly precise illustrations. Therefore, for example, scale reduction, etc., in the figures are not necessarily the same.
OPTICAL DEVICE

TECHNICAL FIELD

The present invention relates to optical devices, and, for example, relates to an optical device whose optical state can change with electricity.

BACKGROUND ART

Optical devices which change their optical states when electricity is supplied thereto have been proposed. For example, Patent Literature (PTL) 1 discloses a light-adjusting element in which an electrolyte layer including an electrochromic material that contains silver is sandwiched between a pair of transparent electrodes and depressions and protrusions of nanometer-scale order are provided in one of the transparent electrodes. The light-adjusting element in PTL 1 can form a mirror state through application of a voltage.

CITATION LIST

Patent Literature

PTL 1: International Publication No. 2012/118188

SUMMARY OF THE INVENTION

Technical Problem

The light-adjusting element in the aforementioned PTL 1 can form a mirror state, but is not configured to change the direction of travel of light to a desired direction.

The present disclosure aims to provide an optical device capable of distributing light.

Solution to Problem

An optical device is disclosed. The optical device includes: a first electrode; a second electrode electrically paired with the first electrode; a refractive index adjustment layer that has a refractive index changing in response to an electric field and is changeable between a transparent state and a state in which the refractive index adjustment layer distributes incident light; and a textured layer including a plurality of protrusions protruding toward the second electrode. The first electrode is light-transmissive. The second electrode is light-transmissive. The first refractive index adjustment layer is provided between the first electrode and the second electrode. The textured layer is provided between the first electrode and the refractive index adjustment layer. The plurality of protrusions are in the form of stripes. The protrusion has a substantially trapezoidal cross-section. The trapezoid of the protrusion has a base angle at both ends of the lower base ranging from 75 degrees to 85 degrees.

Advantageous Effect of Invention

According to the present disclosure, it is possible to provide an optical device capable of distributing light.

DESCRIPTION OF EXEMPLARY EMBODIMENT

Hereinafter, an optical device according to an embodiment of the present invention will be described in detail with reference to the drawings. Note that the embodiment described below shows a specific preferred example of the present invention. Thus, the numerical values, shapes, materials, structural elements, and the arrangement and connection of the structural elements, steps, the processing order of the steps, etc., shown in the following embodiment are mere examples, and are not intended to limit the present invention. Accordingly, among the structural elements in the following embodiment, structural elements not recited in an independent claim indicating the broadest concept of the present invention are described as arbitrary structural elements.

The figures are schematic diagrams and are not necessarily precise illustrations. Therefore, for example, scale reduction, etc., in the figures are not necessarily the same.

Figure 1:
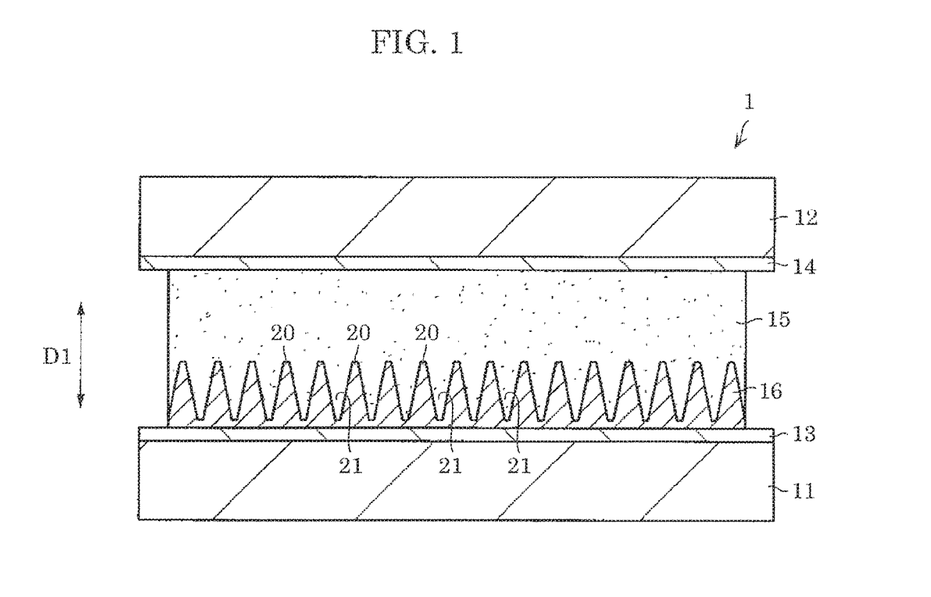
FIG. 1 is a cross-sectional view schematically illustrating an example of an optical device according to an embodiment.

FIG. 1 illustrates an example of an optical device (optical device 1). In FIG. 1, a layer structure of optical device 1 is schematically illustrated, and the actual size, etc., of each portion of optical device 1 is not limited to that in the illustration. Optical device 1 can be formed into a panel shape.

Figure 2:
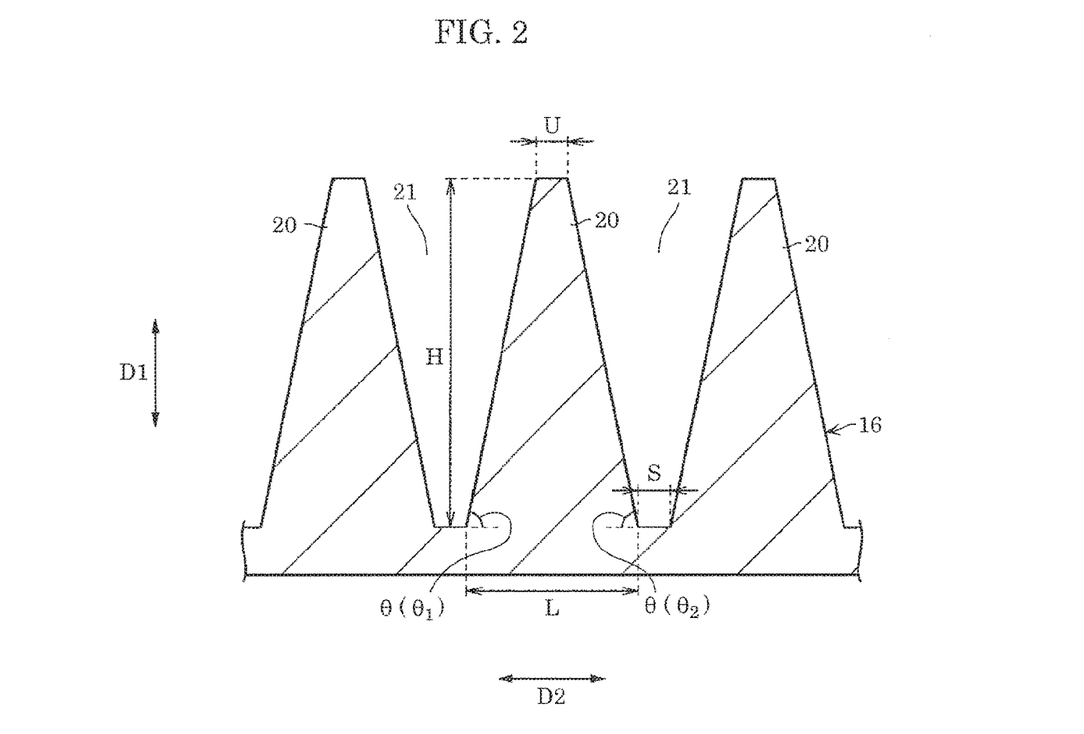
FIG. 2 is a cross-sectional view schematically illustrating an example of a textured layer according to an embodiment.
Figure 3:
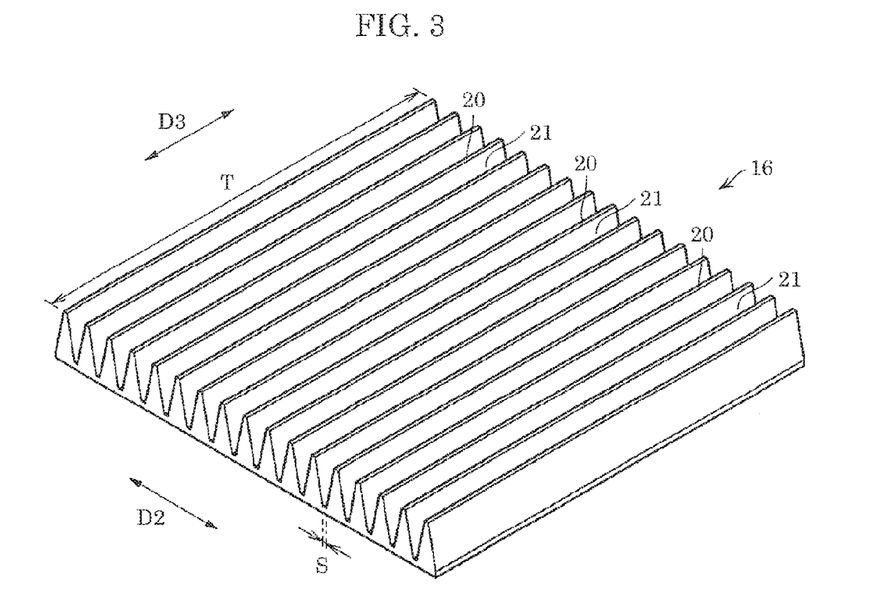
FIG. 3 is a perspective view schematically illustrating an example of a textured layer according to an embodiment.

FIG. 2 and FIG. 3 illustrate an example of textured layer 16 incorporated into optical device 1. In FIG. 2, an enlarged cross-sectional view of textured layer 16 is illustrated. In FIG. 3, a clipped portion of textured layer 16 viewed from obliquely above is illustrated.

Optical device 1 includes: first electrode 13; second electrode 14; refractive index adjustment layer that has a refractive index changing in response to an electric field and is changeable between a transparent state and a state in which refractive index adjustment layer 15 distributes incident light; and textured layer 16 including a plurality of protrusions 20 protruding toward the second electrode 14. First electrode 13 and second electrode 14 are light-transmissive. Second electrode 14 is electrically paired with first electrode 13. Refractive index adjustment layer 15 is provided between first electrode 13 and second electrode 14. Textured layer 16 is provided between first electrode 13 and refractive index adjustment layer 15. The plurality of protrusions 20 are in the form of stripes. Protrusion 20 has a substantially trapezoidal or triangular cross-section. A trapezoid or a triangle which is a cross-sectional shape of protrusion 20 has a base angle θ at both ends of the lower base ranging from 70 degrees to 85 degrees.

Optical device 1 can create a transparent state and a light distribution state according to a change in the refractive index of refractive index adjustment layer 15. In particular, when each of the plurality of protrusions 20 of textured layer 16 has the aforementioned trapezoidal shape, it is possible to effectively change the direction of travel of incoming light. A change in the direction of travel of the light increases the difference in light between the transparent state and the light distribution state. Consequently, optical device 1 is capable of increasing the difference between the transparent state and the light distribution state and thus has good optical properties.

Optical device 1 further includes first substrate 11 and second substrate 12. A layered structure of first electrode 13, textured layer 16, refractive index adjustment layer 15, and second electrode 14 is provided between first substrate 11 and second substrate 12 which support this layered structure. Furthermore, first substrate 11 and second substrate 12 protect this layered structure. Moreover, one of first substrate 11 and second substrate 12 can function as a base substrate on which the layered structure is formed, and the other can function as a cover substrate which covers the layered structure.

In optical device 1 in FIG. 1, first electrode 13, textured layer 16, refractive index adjustment layer 15, and second electrode 14 are provided in this order between a pair of substrates (first substrate 11 and second substrate 12). These layers are arranged in the thickness direction.

Herein, "the thickness direction" means the thickness direction of optical device 1 unless otherwise noted. In FIG. 1, the thickness direction is indicated by D1. The thickness direction may be a direction perpendicular to a surface of first substrate 11. The thickness direction includes a stacking direction. The thickness direction includes a direction from first electrode 13 toward second electrode 14 and a direction from second electrode 14 toward first electrode 13. In FIG. 1, the layers of optical device 1 can be considered to spread laterally and also spread perpendicularly to the plane defined by the sheet of the drawing. The wording "plan view" means a view seen along the direction (thickness direction D1) perpendicular to the surface of the substrate.

Optical device 1 allows the passage of light. Optical device 1 may be a window. When optical device 1 is fitted onto an exterior wall of a building, outside light is allowed to enter the inside of the building. First substrate 11 may be positioned on the outdoor side. Second substrate 12 may be positioned on the indoor side. Naturally, second substrate 12 may be positioned on the outdoor side and first substrate 11 may be positioned on the indoor side. Optical device 1 may be fitted onto a part other than the exterior wall. For example, optical device 1 may be fitted onto an interior wall, a partition, or the like. Optical device 1 may be used as an on-vehicle window. First substrate 11 is defined as a substrate on the side on which light enters.

A pair of electrodes (first electrode 13 and second electrode 14) are configured to be able to apply an electric field to refractive index adjustment layer 15. One of the electrodes in the pair functions as an anode, and the other functions as a cathode. The refractive index of refractive index adjustment layer 15 changes through application of a voltage by the pair of electrodes. The pair of electrodes function as electrodes for driving optical device 1. The electrodes are in the form of layers.

First electrode 13 and second electrode 14 may each be configured of, for example, a transparent conductive layer. Transparent metal oxide, conductive particle-containing resin, a thin metal film, or the like can be used as a material of the transparent conductive layer. One example of the material of the electrode that is light-transmissive is transparent metal oxide such as indium tin oxide (ITO) or indium zinc oxide (IZO). An electrode including transparent metal oxide is preferably used as an electrode of optical device 1.

At least one of first electrode 13 and second electrode 14 may contain metal. Metal can reduce the resistance of the electrode. With metal, an electric current becomes more likely to flow evenly in a plane of optical device 1, and thus in-plane distribution of optical properties may improve. However, when a large amount of metal is contained, the light-transmitting properties of the electrode may be reduced, and therefore metal is contained in an amount that does not cause adverse effects on the light-transmitting properties of the electrode. For example, metal may be contained in the form of a metal nanowire, a metal auxiliary line or a thin metal film in the electrode. The metal nanowire (for example, silver nanowire) may be dispersed in the transparent conductive layer. The metal auxiliary line may be provided above the transparent conductive layer, in contact therewith. The thin metal film may be provided on a surface of the transparent conductive layer.

First electrode 13 and second electrode 14 may be configured to be able to electrically connect to a power supply. In order to connect to the power supply, optical device 1 may include an electrode pad and an electrical connection portion in which electrode pads are electrically collected, for example. The electrical connection portion may be configured of a plug or the like. These electrodes may be connected to the power supply through lines. The power supply may be an external power supply or may be an internal power supply.

First substrate 11 is provided outside first electrode 13. Second substrate 12 is provided outside second electrode 14. In the example in FIG. 1, first substrate 11 is in contact with first electrode 13. Second substrate 12 is in contact with second electrode 14. First substrate 11 and second substrate 12 are light-transmissive.

First substrate 11 and second substrate 12 may be bonded together at end portions. An adhesive may be used in the bonding. The adhesive may be solidified. The adhesive may form a wall portion. The wall portion may define the thickness of a gap between first substrate 11 and second substrate 12. The wall portion may protect an end portion of refractive index adjustment layer 15.

First substrate 11 and second substrate 12 may be configured using the same substrate material or may be configured using different substrate materials, but are preferably configured using the same substrate material. Examples of the substrate material include a glass substrate and a resin substrate. Examples of the material of the glass substrate include soda glass, alkali-free glass, and high refractive index glass. Examples of the material of the resin substrate include polyethylene terephthalate (PET) and polyethylene naphthalate (PEN). The glass substrate has the advantages of high transparency. The glass substrate has the advantages of high moisture-proof properties. The resin substrate has the advantage of being less scattered upon breakage. A flexible substrate may be used. The flexible substrate can be bent. The flexible substrate offers excellent handleability. The flexible substrate can be easily formed using a resin substrate or thin glass. First substrate 11 and second substrate 12 may have the same thickness or may have different thicknesses. From the perspective of reducing the number of materials, it is preferred that these have the same thickness.

In the visible light range, the difference in refractive index between first substrate 11 and first electrode 13 is smaller than a predetermined value. This allows light to effectively pass through the interface therebetween. For example, the difference in refractive index between first substrate 11 and first electrode 13 is preferably 0.2 or less and more preferably 0.1 or less.

In the visible light range, the difference in refractive index between second substrate 12 and second electrode 14 is smaller than a predetermined value. This allows light to effectively pass through the interface therebetween. For example, the difference in refractive index between second substrate 12 and second electrode 14 is preferably 0.2 or less and more preferably 0.1 or less.

First substrate 11 and second substrate 12 may have approximately the same refractive index; for example, the difference in refractive index between first substrate 11 and second substrate 12 may be 0.1 or less. First electrode 13 and second electrode 14 may have approximately the same refractive index. For example, the difference in refractive index between first electrode 13 and second electrode 14 may be 0.1 or less. The refractive index of first substrate 11 and second substrate 12 may be in the range of 1.3 to 2.0, for example, but is not limited to this range. The refractive index of first electrode 13 and second electrode 14 may be in the range of 1.3 to 2.0, for example, but is not limited to this range.

The thickness of first substrate 11 and second substrate 12 is not particularly limited, but may be in the range of 0.1 mm to 10 mm, for example. The thickness of first electrode 13 and second electrode 14 is not particularly limited, but may be in the range of 10 nm to 200 nm, for example.

Textured layer 16 is provided between first electrode 13 and refractive index adjustment layer 15. Textured layer 16 is in contact with first electrode 13. Textured layer 16 is in contact with refractive index adjustment layer 15. Textured layer 16 has a textured surface. Textured layer 16 includes protrusion 20 and recess 21. Textured layer 16 is in the form of a film. In the present disclosure, the film means an integrally spread element having a planar shape. Note that the film may be segmented at an appropriate point. Furthermore, textured layer 16 does not need to be in the form of a film. For example, in textured layer 16, the plurality of protrusions 20 may be separated in the position of recess 21. In FIG. 1, textured layer 16 is continuous in a planar pattern. Textured layer 16 includes no segmented region at least within a predetermined region that can be called a film (for example, a 1 cm by 1 cm region). Textured layer 16 may be formed so as to separate layers adjacent to each other in the thickness direction. Textured layer 16 may cover an adjacent layer (first electrode 13 and/or refractive index adjustment layer 15). Textured layer 16 has a flat surface facing first electrode 13 and a textured surface facing refractive index adjustment layer 15. The arrangement of the plurality of protrusions 20 forms the textured surface of textured layer 16.

As illustrated in FIG. 2 and FIG. 3, textured layer 16 includes the plurality of protrusions 20 each having a substantially trapezoidal cross-section. The plurality of protrusions 20 are arranged at a distance in direction D2 parallel to a surface of first substrate 11. Direction D1 and direction D2 are in a perpendicular relationship. As illustrated in FIG. 3, protrusion 20 extends in direction D3 perpendicular to both of direction D1 and direction D2 while maintaining the shape of its trapezoidal cross-section. Protrusion 20 has an elongated shape. As a result of being arranged as described above, the plurality of protrusions 20 form a pattern of stripes in plan view.

Recess 21 is provided between adjacent protrusions 20 among the plurality of protrusions 20. Recess 21 is in the form of a groove. Recess 21 also extends in direction D3 and has an elongated shape. The plurality of recesses 21 also form a pattern of stripes.

Length T of protrusion 20 in direction D3 is not particularly limited. In the case where protrusion 20 extends over the entire length of textured layer 16 in direction D3, the length of textured layer 16 in direction D3 is the length of protrusion 20. Elongated protrusion 20 may be segmented in direction D3. Length T of protrusion 20 may be in the range of 10 cm to 1,000 cm, for example.

As illustrated in FIG. 2, the trapezoid which is a cross-sectional shape of protrusion 20 has an upper base, a lower base, legs, height H, and base angles θ. The length of the upper base is denoted as sign U, and the length of the lower base is denoted as sign L. The legs are a pair of opposite sides other than the upper base and the lower base. Base angle θ is located at both ends of the lower base of the trapezoid of protrusion 20. Base angles θ include first base angle θ1 and second base angle θ2. First, base angle θ1 and second base angle θ2 may be the same or may be different. In the case where first base angle θ1 and second base angle θ2 are the same, the cross-section of protrusion 20 is in the shape of an isosceles trapezoid. Note that the cross-section of protrusion 20 may have a trapezoidal (quadrangular) shape with rounded sides or may have a trapezoidal (quadrangular) shape with rounded corners as long as it is included in the concept of a trapezoid.

In optical device 1 in the present embodiment, base angle θ ranges from 70 degrees to 85 degrees. Specifically, both of first base angle θ1 and second base angle θ2 are included in the range of 70 degrees to 85 degrees. In this case, a side surface (sloped surface) of protrusion 20, that is, a surface defined by the leg of the trapezoid, is a steep slope surface that forms a large angle with the surface of first substrate 11. When the trapezoid of protrusion 20 has a steep slope surface as just mentioned, it is possible to efficiently change the direction of travel of light, leading to an improvement in the light distribution properties. A reason for this is considered to be a high likelihood of obliquely incoming light impinging on the sloped surface of protrusion 20 at an angle that allows the light to be totally reflected.

The trapezoid which is a cross-sectional shape of protrusion 20 preferably has height H ranging from 5 μm to 25 μm. When height H is in this range, the light distribution properties further improve. A reason for this is considered to be a favorable amount of light impinging on the sloped surface of protrusion 20. It is presumed that the occurrence of one protrusion 20 casting a shadow on another protrusion 20 is reduced.

The lower base of the trapezoid which is a cross-sectional shape of protrusion 20 may have length L ranging from 3 μm to 20 μm, for example. When the length of the lower base is in this range, it is possible to efficiently change the direction of travel of light. When length L of the lower base and base angle θ are determined, length U of the upper base of the trapezoid of protrusion 20 is determined using a trigonometric function. The lower base of the trapezoid of protrusion 20 may have length L ranging from 1 μm to 10 μm, for example.

The trapezoid which is a cross-sectional shape of protrusion 20 may have a pointed shape. Length L of the lower base may be greater than or equal to two times length U of the upper base. Height H of the trapezoid may be greater than length U of the upper base. Height H of the trapezoid may be greater than length L of the lower base.

The plurality of protrusions 20 are arranged at distance S. Distance S is a distance between adjacent protrusions 20. Distance S between protrusions 20 may range from 1 μm to 4 μm. When distance S is in this range, the light distribution properties further improve. Distance S between two adjacent protrusions 20 is substantially constant. This means that two adjacent protrusions 20 are formed substantially in parallel with each other.

Distances S may be non-uniform and have a mound-shaped distribution. The mound-shaped distribution may be, in particular, exponential distributions of distances S symmetrically arranged on both sides of the peak of a mound-shaped curve. With the exponential distributions, the arrangement of distances S is random. Distance S is the distance between protrusion 20 and protrusion 20 that are adjacent to each other; there are a plurality of distances S in the entirety of textured layer 16. Considering the plurality of distances S, the plurality of distances S may be nonuniform in the plane, that is, do not need to be the same. Specifically, distance S may vary in the range of 1 μm to 4 μm. For example, distance S in one place is 3 μm, distance S in another place is 2.8 μm, and distance S in yet another place is 3.2 μm. Distances S having different values may be arranged at random. The plurality of distances S may have a mound-shaped distribution when the existence probability thereof is statistically analyzed from all distances S. The mound-shaped distribution includes a single mound. The top of the mound is a peak. The peak may be located in the middle of the mound or may be located off of the middle of the mound. The shape of the mound may be bilaterally symmetrical. A special example of the mound-shaped distribution is a normal distribution. Distances S may have a normal distribution. Furthermore, the heights of adjacent textured structures may be non-uniform and may have a mound-shaped distribution.

Figure 4:
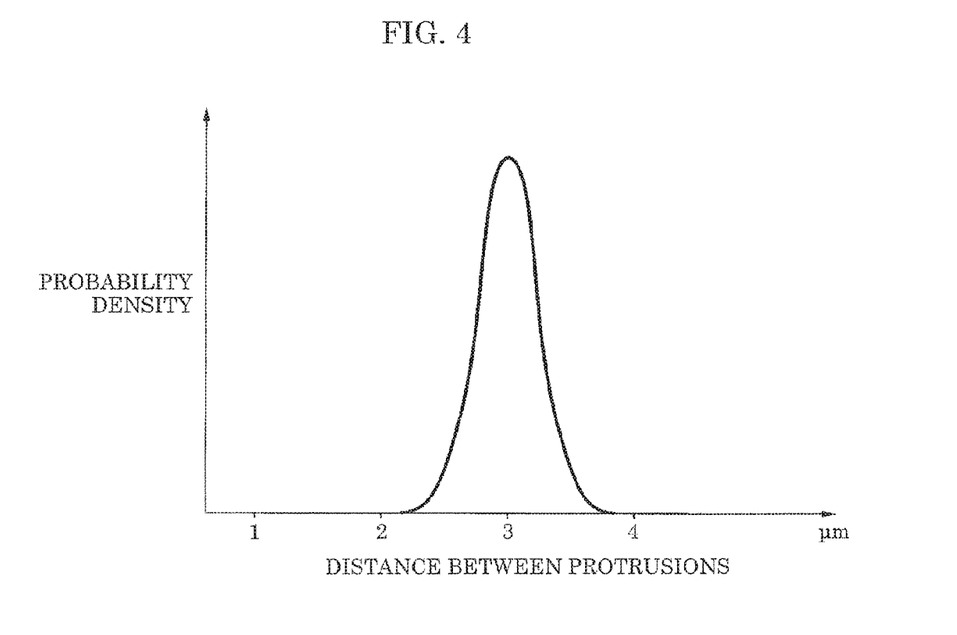
FIG. 4 is a graph illustrating an example of a distribution of distances between protrusions according to an embodiment.

FIG. 4 is a graph illustrating an example of a distribution of distances S between protrusions 20. In FIG. 4, a graph of distances S that have a normal distribution is illustrated. The horizontal axis represents distance S between protrusions 20, and the vertical axis represents the probability density. In this graph, distances S are in the range of 2 μm to 4 μm with an average value of 3 μm as its center, and the shape of the graph is bilaterally symmetrical. The average value of distances S may be in the range of 2 μm to 3.5 μm.

When distances S are non-uniform as described above, the occurrence of a change in the direction of travel of only specific light is reduced, meaning that a change in the travel of light in the entire visible light range is more likely to occur. When the direction of travel of only specific light changes, a color may be generated in the light due to spectrum dispersion of the light as seen in a prism. Furthermore, due to distances S having a mound-shaped distribution, changes in the direction of travel of light are less likely to have a tendency, and thus the light distribution properties of entire optical device 1 improve.

The protrusions and recesses of textured layer 16 may be formed, for example, by imprinting. For example, after a resin layer is formed, a textured mold is pressed against the resin layer, and thus the protrusions and recesses of textured layer 16 are formed by transfer of protrusions and recesses. Height H is greater than distance S in FIG. 2, and such protrusions and recesses are not easily produced in other protrusion and recess production processes such as photolithography. In the case where imprinting is used to produce protrusions and recesses, protrusions and recesses having the shape of a trapezoid with great height H such as those in FIG. 2 can be easily produced.

Textured layer 16 is light-transmissive. The difference in refractive index between textured layer 16 and first electrode 13 is smaller than a predetermined value. This allows light to effectively pass through the interface therebetween. For example, the difference in refractive index between textured layer 16 and first electrode 13 is preferably 0.2 or less and more preferably 0.1 or less. The refractive index of textured layer 16 may be in the range of 1.3 to 2.0, for example, but is not limited to this range. It is particularly preferable that the refractive index of textured layer 16 be in the range of 1.45 to 1.55.

Textured layer 16 may be electrically conductive. With this, the flow of electric current between first electrode 13 and second electrode 14 can be improved. Textured layer 16 may be formed using a material that is used for first electrode 13. First electrode 13 and textured layer 16 may be integrated using the same material. The textured surface, however, can be easily formed when first electrode 13 and textured layer 16 are separate bodies. Textured layer 16 may be formed using a material that allows the protrusions and the recesses to be easily formed. Textured layer 16 may be formed using a material containing resin, for example. Examples of the resin material of textured layer 16 include conductive macromolecules and a conductor-containing resin. Examples of the conductive macromolecules include poly(3,4-ethylenedioxythiophene) (PEDOT). Examples of the conductor include a metal nanowire such as an Ag nanowire. The metal nanowire may be mixed with resin such as cellulose or acrylic. In the case where a mixture material containing a metal nanowire and resin is used, it is possible to adjust the refractive index of textured layer 16 by the resin, and thus the refractive index of textured layer 16 can be easily brought close to the refractive indices of first substrate 11, second substrate 12, and refractive index adjustment layer 15. Note that when it is possible to apply a voltage, textured layer 16 may be formed using an insulating material. In this case, textured layer 16 may be formed using resin, an inorganic layer, or the like. Even in the case where textured layer 16 is an insulating layer, it is possible to apply a voltage between first electrode 13 and second electrode 14 when the difference in voltage between first electrode 13 and second electrode 14 is increased.

Refractive index adjustment layer 15 is in contact with textured layer 16. A surface of refractive index adjustment layer 15 that faces textured layer 16 is an uneven surface. The textured surface of refractive index adjustment layer 15 may be formed using the protrusions and recesses of textured layer 16 as a die. The protrusions of refractive index adjustment layer 15 correspond to recesses 21 of textured layer 16. The recesses of refractive index adjustment layer 15 correspond to protrusions 20 of textured layer 16. The interface between refractive index adjustment layer 15 and textured layer 16 is a textured interface.

The refractive index of refractive index adjustment layer 15 in the visible light range is preferably adjustable to (i) a refractive index close to the refractive index of textured layer 16 and (ii) a refractive index significantly different from the refractive index of textured layer 16. This makes it possible to increase the difference between the light distribution state and the transparent state. Refractive index adjustment layer 15 is variable between the following two states: a state in which the refractive index of refractive index adjustment layer 15 is close to the refractive index of textured layer 16; and a state in which the refractive index of refractive index adjustment layer 15 is significantly different from the refractive index of textured layer 16. In the state in which the refractive index of refractive index adjustment layer 15 is close to the refractive index of textured layer 16, the difference in refractive index between refractive index adjustment layer 15 and textured layer 16 is preferably 0.2 or less and more preferably 0.1 or less, for example. In the state in which the refractive index of refractive index adjustment layer 15 is significantly different from the refractive index of textured layer 16, the difference in refractive index between refractive index adjustment layer 15 and textured layer 16 is preferably more than 0.1 and more preferably 0.2 or more, for example. Note that in the present disclosure, the refractive index means the refractive index in thickness direction D1 unless otherwise noted.

The refractive index of refractive index adjustment layer 15 may approach the refractive index of textured layer 16 when a voltage is applied, and the difference in refractive index between refractive index adjustment layer 15 and textured layer 16 may increase when no voltage is applied. Refractive index adjustment layer 15 may be placed into the non-light distribution state (the transparent state) when the difference in refractive index between refractive index adjustment layer 15 and textured layer 16 is small and may be placed into the light distribution state when the difference in refractive index between refractive index adjustment layer 15 and textured layer 16 is large.

Refractive index adjustment layer 15 may contain a medium responsive to an electric field and having birefringence. The refractive index changes efficiently due to the medium having birefringence. The refractive index changes easily through application of a voltage due to the medium being responsive to an electric field. The birefringence means that the refractive index is different according to the direction. For example, when the refractive index is different between thickness direction D1 and direction D2, birefringence is provided.

The medium in refractive index adjustment layer 15 may contain liquid crystals. Liquid crystals allow birefringence to be easily exhibited, providing the property of being responsive to an electric field. Liquid crystals may serve as a material having a refractive index that changes by power. Therefore, the refractive index of refractive index adjustment layer 15 changes easily. The liquid crystals are preferably oriented. The orientation of the liquid crystals makes it possible to effectively control the direction of travel of light.

Liquid crystals may have orientation. Liquid crystals allow smooth passage of light in a specific direction when molecules in the liquid crystals are oriented in the same direction. Thus, the optical properties improve when the molecules in the liquid crystals are oriented in the same direction. The liquid crystals may be oriented not only when a voltage is applied, but also when no voltage is applied.

Figure 5A:
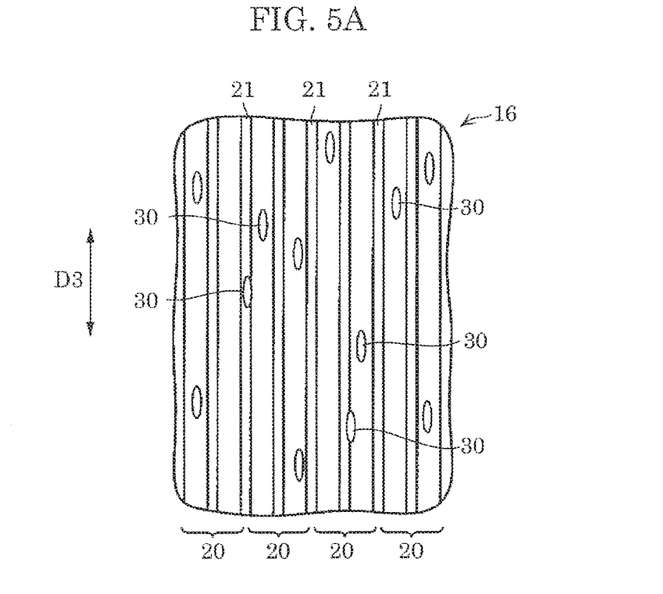
FIG. 5A is a cross-sectional view schematically illustrating an example of an optical device according to an embodiment.
Figure 5B:
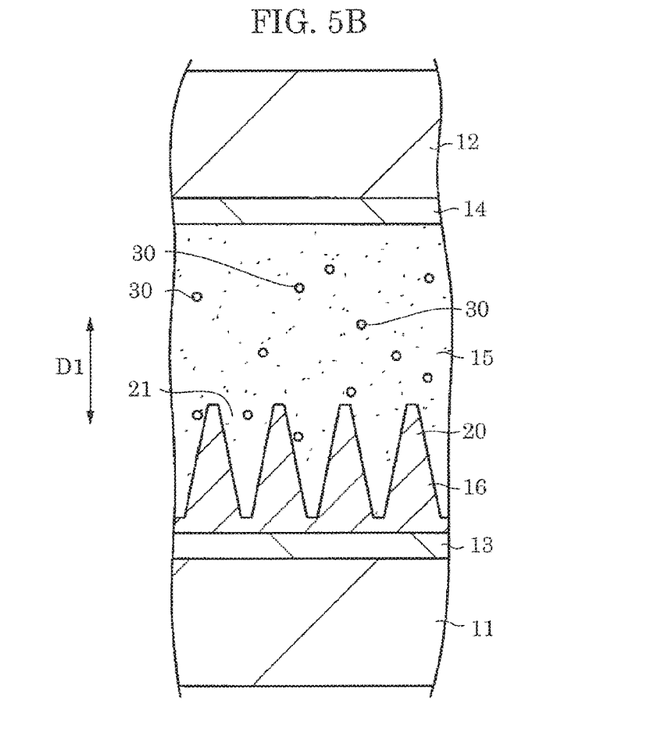
FIG. 5B is a cross-sectional view schematically illustrating an example of an optical device according to an embodiment.

FIG. 5A and FIG. 5B illustrate an example of a preferred implementation of the orientation of liquid crystals. In FIG. 5A, textured layer 16 and ellipsoids 30 representing liquid crystal molecules are clipped out and depicted. In one implementation, the liquid crystals are oriented in parallel with the direction in which the plurality of protrusions 20 extend. Such an implementation is schematically illustrated in FIG. 5A and FIG. 5B. In this case, since the direction of travel of light changes at the interface between textured layer 16 and refractive index adjustment layer 15, the refractive index of the protrusions with improved light distribution properties and the refractive index of the liquid crystals in the direction of travel of light do not substantially match, and light is refracted according to Snell's law. This implementation is particularly preferable when the dielectric constant anisotropy of the liquid crystals is positive. At this time, the liquid crystals are oriented in the normal direction of the substrate when an electric field is applied to the liquid crystals. When the refractive index of the protrusions and the refractive index of the liquid crystals substantially match, light is not refracted at the interface, and thus the light distribution properties are not exhibited. In this way, ON and OFF of the electric field make it possible to control the light distribution properties.

In FIG. 5A and FIG. 5B, liquid crystal molecules are schematically depicted by ellipsoids 30. As illustrated in FIG. 5A and FIG. 6B, ellipsoids 30 are arranged so that axes thereof extend in a direction in which protrusions 20 and recesses 21 extend, that is, a direction in which a groove formed of recesses 21 runs. The longitudinal direction of ellipsoid 30 matches the longitudinal direction of protrusion 20. The orientation of the liquid crystals may be parallel to direction D3. When the liquid crystal molecules have such orientation, the light distribution properties improve efficiently. Note that FIG. 5A and FIG. 5B are schematic views for illustrating the orientation of the liquid crystals; actual liquid crystal molecules may be very small compared to the size of protrusion 20.

Figure 6:
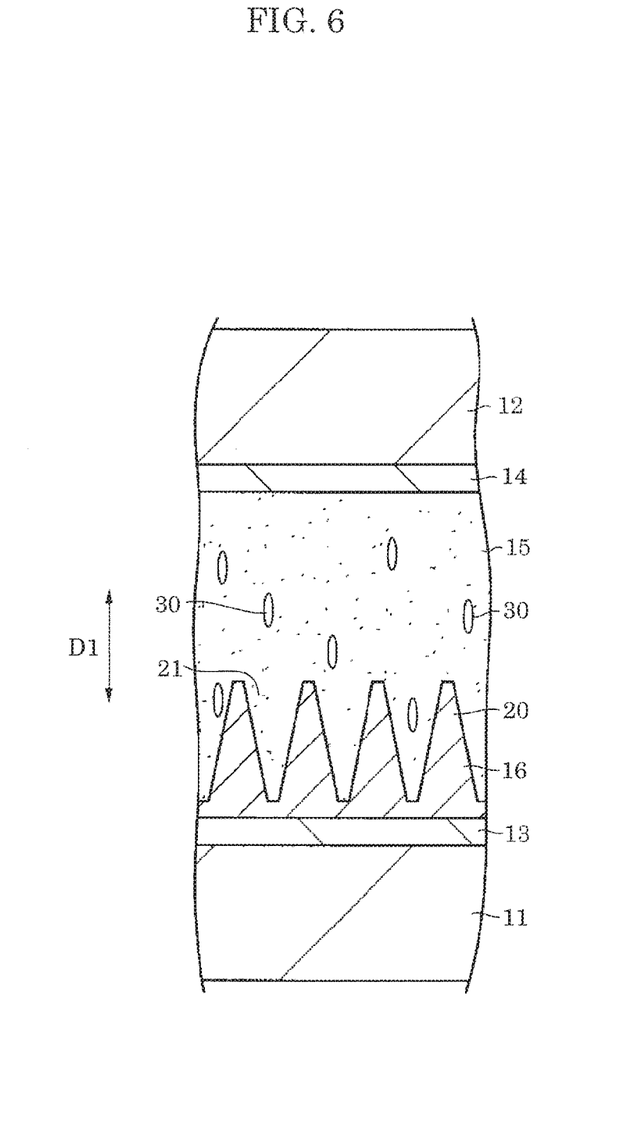
FIG. 6 is a cross-sectional view schematically illustrating an example of an optical device according to an embodiment.

FIG. 6 illustrates another example of the implementation of the orientation of the liquid crystals. In another implementation, the liquid crystals are oriented along thickness direction D1 of optical device 1. In this case, when no electric field is applied, that is, when OFF, the refractive index of the protrusions and the refractive index of the liquid crystals substantially match, meaning that the light distribution properties are not exhibited. When an electric field is applied (when ON), the liquid crystals are oriented in the groove direction, and thus a difference in refractive index is generated between the protrusions and the liquid crystals, meaning that the light distribution properties are exhibited. This implementation is particularly preferable when the dielectric constant anisotropy of the liquid crystals is negative.

In FIG. 6 as well, the liquid crystal molecules are schematically depicted by ellipsoids 30. As illustrated in FIG. 6, ellipsoids 30 are arranged so that axes thereof extend in thickness direction D1 of optical device 1, that is, a direction in which protrusions 20 protrude. The longitudinal direction of ellipsoid 30 matches a direction perpendicular to the surface of first substrate 11. The orientation of the liquid crystals may be parallel to thickness direction D1.

Examples of the liquid crystals contained in refractive index adjustment layer 15 include nematic liquid crystals, cholesteric liquid crystals, and ferroelectric liquid crystals.

Refractive index adjustment layer 15 may contain macromolecules. In the case where refractive index adjustment layer 15 contains macromolecules, the scattering of the material of refractive index adjustment layer 15 and the material of the substrates can be limited even when optical device 1 is broken. This improves the safety. Macromolecules stabilize changes in the refractive index of refractive index adjustment layer 15. Thus, the light distribution properties are stabilized.

Refractive index adjustment layer 15 may have a polymer structure formed using macromolecules. The polymer structure may be formed of a cross-linked structure of macromolecular chains. The polymer structure may be formed of entangled macromolecules. The polymer structure may have a mesh structure. As a result of providing liquid crystals between the meshes of the polymer structure, it is possible to adjust the refractive index. The macromolecules can provide the light scattering properties to refractive index adjustment layer 15.

As the material of refractive index adjustment layer 15 that contains macromolecules, polymer dispersed liquid crystals are preferably used. Since liquid crystals are held by macromolecules in the polymer dispersed liquid crystals, stable refractive index adjustment layer 15 can be formed using the polymer dispersed liquid crystals. The polymer dispersed liquid crystals are called PDLC. Furthermore, polymer network liquid crystals may be used as the material of refractive index adjustment layer 15. The polymer network liquid crystals are called PNLC.

The polymer dispersed liquid crystals and the polymer network liquid crystals may include a resin portion and a liquid crystal portion. The resin portion is formed using macromolecules. The resin portion may be light-transmissive. With this, it is possible to form refractive index adjustment layer 15 having a variable refractive index. The resin portion may be formed using a thermosetting resin, an ultraviolet curable resin, or the like. The liquid crystal portion is a portion having a liquid crystal structure that changes in response to the electric field. As the liquid crystal portion, nematic liquid crystals or the like are used. The polymer dispersed liquid crystals and the polymer network liquid crystals may have a structure in which the resin portion is dotted with the liquid crystal portion. The polymer dispersed liquid crystals and the polymer network liquid crystals may have a sea-island structure in which the resin portion is the sea and the liquid crystal portion is the island. As the shape of the polymer dispersed liquid crystals and the polymer network liquid crystals, the liquid crystal portion may be connected in an irregular, mesh pattern in the resin portion. Naturally, the polymer dispersed liquid crystals and the polymer network liquid crystals may have a structure in which the liquid crystal portion is dotted with the resin portion or that the resin portion is connected in an irregular, mesh pattern in the liquid crystal portion, for example.

In the case where retractive index adjustment layer 15 contains macromolecules, refractive index adjustment layer 15 has increased retaining properties. The material of refractive index adjustment layer 15 is less likely to flow therein. Refractive index adjustment layer 15 may be highly maintained with an adjusted refractive index.

The refractive index of refractive index adjustment layer 15 may be smaller than the refractive index of textured layer 16 when the difference in refractive index between refractive index adjustment layer 15 and textured layer 16 is large. With this, the direction of travel of light can be easily changed. The refractive index of refractive index adjustment layer 15 may be larger than the refractive index of textured layer 16 when the difference in refractive index between refractive index adjustment layer 15 and textured layer 16 is large. With this, the direction of travel of light can be easily changed. How the refractive index of refractive index adjustment layer 15 changes may be set according to a target light distribution.

Refractive index adjustment layer 15 may be supplied with power from an alternating-current power supply or may be supplied with power from a direct-current power supply. Refractive index adjustment layer 15 is preferably supplied with power from an alternating-current power supply. This is because, when a direct-current power supply is used, mobile ions contained in the liquid crystals gather on the interface (light distribution film) with one of the layers, and thus a problem occurs that the actual intensity of the electric field to be applied to a liquid crystal layer (refractive index adjustment layer 15) is reduced. The waveform of the alternating current may be a rectangular wave. This is because it is less likely to have plus/minus impacts on the orientation of the liquid crystals. The state after the refractive index changes can be more likely to be stabilized. The alternating current may be a pulse. The state of refractive index adjustment layer 15 when a voltage is applied may be maintained. Accordingly, it is sufficient that power be supplied only when needed, and thus the power efficiency improves. The longer the period of time in which the refractive index is maintained, the better; for example, one hour or more is preferable, and 12 hours or more is more preferable.

A method for manufacturing optical device 1 will be described. For example, optical device 1 may be formed by arranging first substrate 11 having first electrode 13 and textured layer 16 thereon and second substrate 12 having second electrode 14 thereon so as to face each other and injecting a fluid material of refractive index adjustment layer 15 into the space between first substrate 11 and second substrate 12. The protrusions and recesses of the surface of textured layer 16 are formed, for example, by imprinting, before the substrates are arranged so as to face each other. Nanoimprinting may be used to form the protrusions and the recesses. First substrate 11 and second substrate 12 may be bonded together at end portions with an adhesive.

Figure 7A:
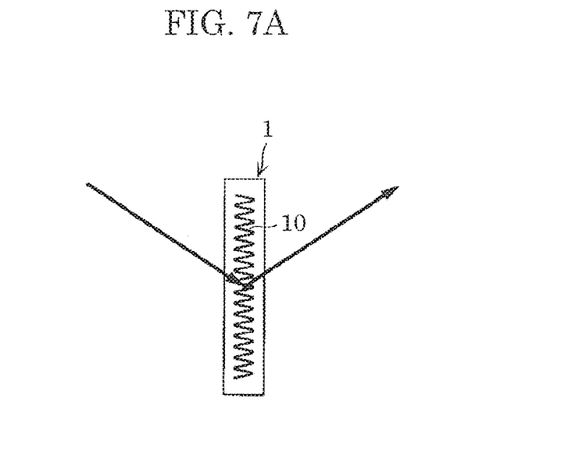
FIG. 7A illustrates a light distribution state of an optical device according to an embodiment.
Figure 7B:
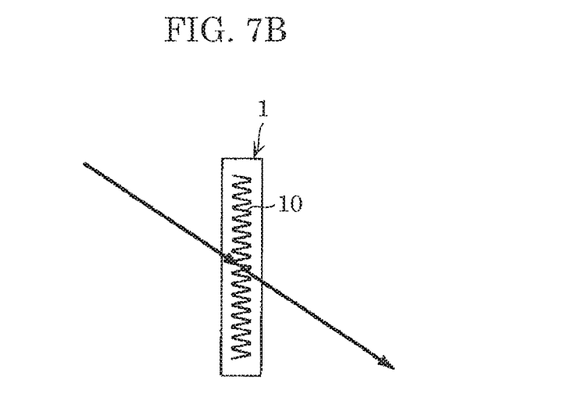
FIG. 7B illustrates a non-light distribution state of an optical device according to an embodiment.

The effect of optical device 1 will be described with reference to FIG. 7A and FIG. 7B. FIG. 7A illustrates the light distribution state of optical device 1, and FIG. 7B illustrates the non-light distribution state (the transparent state) of optical device 1. In FIG. 7A and FIG. 7B, optical device 1 is vertically provided like a window. Optical device 1 transitions at least between the light distribution state illustrated in FIG. 7A and the non-light distribution state illustrated in FIG. 7B.

FIG. 7A and FIG. 7B depict simplified view of optical device 1. Optical device 1 includes textured interface 10. Textured interface 10 is the interface between refractive index adjustment layer 15 and textured layer 16.

FIG. 7B illustrates the traveling light when optical device 1 is in the transparent state. Light is indicated by an arrow. Light may travel obliquely with respect to a direction perpendicular to the surface of optical device 1 (the same direction as the thickness direction). Especially when optical device 1 is a window, light is likely to be incident at an angle. Light passing through optical device 1 in the transparent state travels straight ahead. For example, when light from outside (outside light) is incident on optical device 1, the outside light remains in its original direction upon entering the inside.

Optical device 1 is placed into the transparent state as a result of matching between the refractive index of refractive index adjustment layer 15 and the refractive index of textured layer 16. As the difference in the refractive index between textured layer 16 and refractive index adjustment layer 15 decreases, the change in the direction of travel of light due to the difference in the refractive index decreases. When the difference in the refractive index between these layers is eliminated or becomes negligible, a change in the travel of light due to the difference in the refractive index rarely occurs, and a change in the travel of light at textured interface 10 also rarely occurs. Thus, the direction of travel of light is maintained when the light passes through textured interface 10.

Turning ON/OFF of a voltage allows optical device 1 to switch, for example, between the light distribution state and the transparent state. The orientations of substances in refractive index adjustment layer 15 are aligned through the application of a voltage so that the difference in the refractive index between textured layer 16 and refractive index adjustment layer 15 is reduced, and thus the transparency can be obtained. The optical state after the voltage is changed may be maintained.

FIG. 7A illustrates the traveling light when optical device 1 is in the light distribution state. Light is indicated by an arrow. The direction of travel of light incident on optical device 1 in the light distribution state is changed inside optical device 1. The direction of travel of the light may be changed at textured interface 10. Optical device 1 may change the direction of travel of light into a target direction. Thus, light can be distributed in optical device 1. In FIG. 7A, the direction of travel of light traveling toward optical device 1 is changed to the backward direction (the rebound direction). In FIG. 7A, the light that has traveled downward passes through optical device 1 and then travels upward. When light is bent in the backward direction, optical device 1 having better optical properties can be obtained.

Optical device 1 is placed into the light distribution state due to mismatching between the refractive index of refractive index adjustment layer 15 and the refractive index of textured layer 16. When the difference in the refractive index between textured layer 16 and refractive index adjustment layer 15 is large, the direction of travel of light is likely to change due to the difference in the refractive index, and furthermore, a change in the direction of travel of the light at textured interface 10 is added, allowing a change in the direction of travel of the light so that the light is bent. And it is possible to cause the light to travel in a target direction by controlling the difference in the refractive index between these layers. Although FIG. 7A schematically depicts the direction of travel of light that is bent in one direction, the light may travel in a diffused manner. The light may be distributed in such a way that the amount of light in a target direction among the components of light increases. When the amount of light in a specific direction increases, the optical properties improve.

In optical device 1, light may be scattered at refractive index adjustment layer 15. The light scattering properties in this case are the properties of light that can be scattered while the light distribution properties thereof are maintained. When the light scattering properties are provided, the glare of light can be reduced.

Optical device 1 can be fitted to a wall, etc., of a building. The outside of a building is an outdoor area, and the inside of a building is an indoor area. Optical device 1 can function as a window.

As illustrated in FIG. 7B, outside light enters the indoor area through optical device 1 in the state in which optical device 1 is transparent. The outside light is usually sunlight. Optical device 1 is in an optical state similar to, for example, the optical state of a glass window. At this time, the indoor area becomes bright with incident light, but, for example, in the case where the indoor area is large in depth, the indoor area is not likely to become entirely bright. Therefore, in a building having a glass window, a luminaire is often ON to illuminate the indoor area even during daytime.

In the state in FIG. 7A, optical device 1 has light distribution properties. In this case, optical device 1 can change the direction of travel of light and distribute the light so that light traveling in a direction in which traveling light is likely to reach a deep part of the indoor area is generated or increased. In FIG. 7A, light is changed to a direction toward the ceiling. The light traveling obliquely downward becomes light traveling obliquely upward by passing through optical device 1. Note that since the light distribution occurs not completely, but partially, there may be light bent toward the ceiling and light traveling straight ahead. At this time, the main component of light is preferably light bent by the light distribution. When light is distributed as illustrated in FIG. 7A, light reaches an inward part of the indoor area, and thus even a deep part (a location far from optical device 1) of the indoor area becomes bright. Accordingly, the luminaire can be OFF or the power consumption of the luminaire can be reduced, meaning that energy can be saved.

EXAMPLES

Optical devices were produced, and it was confirmed that the light distribution properties improved because of the trapezoidal shape of the protrusion described above. The optical devices included textured layers having trapezoidal protrusions indicated in Table 1.

First, a voltage was applied to the optical device, placing the optical device into the transparent state.

Next, the light distribution properties of the optical device to which no voltage had been applied were checked. Upon evaluating the optical device, light (incident light) was caused to enter the optical device at an incident angle of 45 degrees, and the intensity of light (light traveling in a straight line) on the extended line of the incident direction of the light and the intensity of light (distributed light) traveling in a direction at 10 degrees (at an output angle of 10 degrees) with respect to the normal direction of the optical device were measured. The distributed light and the direct light were compared, and the intensity of the distributed light was determined as extremely high (++++), very high (+++), high (++), and slightly high (+). There were no examples in which the distributed light was the same as the direct light (0) and in which the distributed light was weaker than the direct light (−).

Table 1 shows the result. It can be seen from Table 1 that the trapezoidal protrusions described above improve the light distribution properties.

TABLE 1

| | Examples | | | | | | Comparative Examples | |
|---|---|---|---|---|---|---|---|---|
| | 1 | 2 | 3 | 4 | 5 | 6 | 1 | 2 |
| Base angle θ (°) | 80 | 80 | 80 | 80 | 80 | 80 | 65 | 88 |
| Height H (μm) | 20 | 20 | 20 | 20 | 10 | 30 | 20 | 20 |
| Distance S (μm) | 1 to 4* | 3 | 0.8 | 5 | 3 | 3 | 3 | 3 |
| Intensity of oblique light | ++++ | +++ | ++ | ++ | ++ | ++ | + | + |

*The distances are non-uniform and have a mound-shaped distribution in the range of 1 μm to 4 μm with an average of 2.5 μm.

Other Variations

Although the optical device according to the present invention has been described based on the above embodiment and variations thereof, the present invention is not limited to the above embodiment.

For example, although the above embodiment describes an example in which distances S between adjacent protrusions 20 are non-uniform in textured layer 16, distances S may be uniform. Specifically, the plurality of protrusions 20 may be arranged in direction D2 at regular distances S.

Aside from the above, forms obtained by various modifications to the above-described embodiment that can be conceived by a person skilled in the art as well as forms realized by arbitrarily combining structural elements and functions the embodiment which are within the scope of the essence of the present invention are included in the present invention.

The invention claimed is:

1. An optical device, comprising:
a first electrode that is light-transmissive;
a second electrode that is light-transmissive and is electrically paired with the first electrode;
a refractive index adjustment layer that is between the first electrode and the second electrode, has a refractive index that changes in response to an electric field, and is changeable between a transparent state and a light distribution state in which incident light is bent in a specific direction; and
a textured layer that is between the first electrode and the refractive index adjustment layer, on a side of the first electrode which is a light-entry side, and includes a plurality of protrusions protruding toward the second electrode,
wherein the plurality of protrusions are in the form of stripes,
each of the plurality of protrusions has a substantially trapezoidal cross-section,
each of the plurality of protrusions has a base angle at both ends of a lower base of the substantially trapezoidal cross-section ranging from 70 degrees to 85 degrees.

2. The optical device according to claim 1,
wherein the trapezoid which is the cross-sectional shape of each of the plurality of protrusions has a height ranging from 5 μm to 25 μm.

3. The optical device according to claim 1,
wherein adjacent protrusions among the plurality of protrusions are at distances ranging from 1 μm to 4 μm.

4. The optical device according to claim 3,
wherein the distances are non-uniform and have a mound-shaped distribution.

5. The optical device according to claim 1,
wherein the refractive index adjustment layer contains a medium responsive to an electric field and having birefringence.

6. The optical device according to claim 5,
wherein the medium contains liquid crystals, and
the liquid crystals are oriented in parallel with a direction in which the plurality of protrusions extends.

7. The optical device according to claim 5,
wherein the medium contains liquid crystals, and
the liquid crystals are oriented in parallel with a thickness direction of the optical device.

8. The optical device according to claim 1,
wherein, in the transparent state, a difference in refractive index between the refractive index adjustment layer and the textured layer is no more than 0.2, and
in the light distribution state, the difference in refractive index between the refractive index adjustment layer and the textured layer is more than 0.2.

9. The optical device according to claim 1,
wherein the light distribution state distributes a greater amount of light in the specific direction than the transparent state.

10. The optical device according to claim 1,
wherein the light distribution state partially bends the incident light in the specific direction, with a main component of the incident light being bent in the specific direction and a second component of the incident light traveling straight ahead.

11. An optical device, comprising:
a first electrode that is light-transmissive;
a second electrode that is light-transmissive and is electrically paired with the first electrode;
a refractive index adjustment layer that is between the first electrode and the second electrode, has a refractive index that changes in response to an electric field, and is changeable between a transparent state and a light distribution state in which incident light is bent in a specific direction; and
a textured layer that is between the first electrode and the refractive index adjustment layer, on a side of the first electrode which is a light-entry side, and includes a plurality of protrusions protruding toward the second electrode,
wherein the plurality of protrusions are in the form of stripes,
each of the plurality of protrusions has one of a substantially trapezoidal cross-section and a substantially triangular cross-section,
each of the plurality of protrusions has a base angle at both ends of a lower base of the one of the substantially trapezoidal cross-section and the substantially triangular cross-section ranging from 70 degrees to 85 degrees,
adjacent protrusions among the plurality of protrusions are at distances ranging from 1 μm to 4 μm, and
the distances are non-uniform and have a mound-shaped distribution.

* * * * *